US009473927B2

(12) United States Patent
Stenberg et al.

(10) Patent No.: US 9,473,927 B2
(45) Date of Patent: Oct. 18, 2016

(54) METHOD AND SYSTEM FOR ROAMING OF A MOBILE COMMUNICATIONS UNIT

(75) Inventors: Carl-Magnus Stenberg, Karlavägen (SE); Fredrik Salqvist, Sjövägen (SE)

(73) Assignee: GLOBETOUCH AB, Stockholm (SE)

( * ) Notice: Subject to any disclaimer, the term of this patent is extended or adjusted under 35 U.S.C. 154(b) by 297 days.

(21) Appl. No.: 14/130,106

(22) PCT Filed: Jun. 30, 2011

(86) PCT No.: PCT/SE2011/050886
§ 371 (c)(1),
(2), (4) Date: Apr. 9, 2014

(87) PCT Pub. No.: WO2013/002694
PCT Pub. Date: Jan. 3, 2013

(65) Prior Publication Data
US 2014/0220968 A1    Aug. 7, 2014

(51) Int. Cl.
*H04W 8/12* (2009.01)
*H04W 8/18* (2009.01)
(Continued)

(52) U.S. Cl.
CPC .............. *H04W 8/12* (2013.01); *H04W 4/003* (2013.01); *H04W 8/18* (2013.01); *H04W 8/205* (2013.01)

(58) Field of Classification Search
CPC ....... H04W 4/003; H04W 8/12; H04W 8/18; H04W 8/205
See application file for complete search history.

(56) References Cited

U.S. PATENT DOCUMENTS

| 6,738,622 B1 * | 5/2004 | Stadelmann | .......... H04W 8/183 455/432.1 |
| 7,929,953 B2 * | 4/2011 | Jiang | ................. H04W 8/04 455/414.1 |
| 8,750,220 B2 * | 6/2014 | Xie | .................... H04W 8/12 370/310 |

(Continued)

FOREIGN PATENT DOCUMENTS

| EP | 1 703 760 A3 | 3/2006 |
| EP | 2144458 A1 | 1/2010 |

(Continued)

OTHER PUBLICATIONS

International Search Report, dated Mar. 28, 2012, from corresponding PCT application.

(Continued)

*Primary Examiner* — Liton Miah
(74) *Attorney, Agent, or Firm* — Young & Thompson

(57) ABSTRACT

A method for use when a mobile communication device roams between a home network and foreign networks, which device includes a SIM card using an IMSI, includes the steps of storing on the SIM card a first IMSI for network identification; upon receipt of a location update message indicating that the mobile device has moved to a first visited network, firstly causing the HLR to send an instruction message to the mobile device to change, to a second IMSI, the IMSI used for network identification; secondly causing the mobile device to use the second IMSI for network identification and saving the first IMSI; and then causing the mobile device to perform a device network refresh; and upon roaming back to the home network, causing the mobile device to change the IMSI used for network identification back to the first IMSI and then to update its network status.

16 Claims, 3 Drawing Sheets

(51) Int. Cl.
*H04W 4/00* (2009.01)
*H04W 8/20* (2009.01)

(56) References Cited

U.S. PATENT DOCUMENTS

| | | | |
|---|---|---|---|
| 9,008,654 B2* | 4/2015 | Sachanandani | H04L 63/0853 455/418 |
| 9,185,551 B2* | 11/2015 | Lodeweyckx | H04W 8/265 |
| 2002/0197991 A1 | 12/2002 | Anvekar et al. | |
| 2004/0176092 A1 | 9/2004 | Heutschi | |
| 2009/0215449 A1 | 8/2009 | Avner | |

FOREIGN PATENT DOCUMENTS

| | | |
|---|---|---|
| WO | 0176188 A2 | 10/2001 |
| WO | 2005081962 A2 | 9/2005 |
| WO | 2007132233 A2 | 11/2007 |
| WO | 2008103446 A2 | 8/2008 |
| WO | 2011036484 A2 | 3/2011 |

OTHER PUBLICATIONS

European Search Report, dated May 4, 2015, from corresponding European application.

* cited by examiner

METHOD AND SYSTEM FOR ROAMING OF A MOBILE COMMUNICATIONS UNIT

BACKGROUND OF THE INVENTION

The present invention relates to a method and a system for roaming of a mobile communications unit between mobile communication networks in different countries.

DESCRIPTION OF THE RELATED ART

Presently, it is common for mobile operators to have national mobile communication networks, such as networks for mobile data and/or voice communication, for example GSM, GPRS, 3G, LTE, etc. When a mobile communication unit is brought outside of the coverage area of a certain network and into the coverage area of the network of another operator, conventional roaming gives rise to problems with high and unpredictable costs for data and/or voice communication.

These problems are especially common when it comes to mobile data traffic, where costs during roaming with variable tariffs can amount to more than 1000 times higher per data unit as compared to mobile data traffic in the home network. Many times there are no efficient ways of keeping track of the costs during a stay abroad or the like. As a consequence, a user risks unpleasant surprises regarding mobile data costs when returning from a stay within the coverage area of the network of a foreign operator.

EP2144458 describes a method using an interface means to provide a SIM card with information regarding available networks for data traffic as well as connection costs for said networks.

WO2007132233 describes a method for remotely configuring a mobile communications device, and for registering and authenticating users of such a device. Configuration data is received and converted by the device, and a configuration database is updated using the data. In one example, different Subscriber Identity Module (SIM) cards with different International Mobile Subscriber Identities (IMSI) can be tied to the same user account for roaming.

WO2005081962 describes a method for keeping costs down for voice communication when roaming, by establishing a corresponding Voice over IP (VoIP) call when requesting a voice call from a mobile unit over a cellular network.

WO2008103446 describes a method in which the IMSI of a SIM is associated with a local telephone number (MSISDN) when roaming, in order to enjoy local tariffs.

WO2001076188 describes a method in which a care of address is used with a mobile device when performing IP-based communication.

EP1703760 A2 discloses a system using a client executing on a roaming mobile device and in communication with a corresponding central server for provision of local IMSI codes during roaming.

US2009/315449 A1 discloses a system in which a SIM card soft-ware application is used to administer the use of IMSI codes, and in particular to switch to a local IMSI code during roaming of a mobile device using the SIM card.

SUMMARY OF THE INVENTION

The present invention solves the above described problems of high roaming costs in an automatic way which requires minimum network and mobile device modification.

Thus, the invention relates to a method for use when a mobile communication device roams between a mobile communication home network in a home country and one or several mobile communication networks in one or several visited countries, which mobile communication device comprises a SIM card identifying itself to each network using an IMSI, which method is characterized in that the method comprises the steps of a) storing on the SIM card a first IMSI and using it for network identification of the SIM card; b) upon receipt of a location update message indicating that the mobile device has moved from the coverage area of the home network to the coverage area of a first visited network in a first visited country, firstly causing the home network to send an instruction message over the air to the mobile device to change, to a second IMSI which is associated with the Home Location Registry (HLR) of a first collaborating mobile communication network in the first visited country, the IMSI used for network identification of the SIM card; secondly causing the mobile device to store the second IMSI on the SIM card and to use it for network identification of the SIM card and in addition to save the first IMSI; and then causing the mobile device to update its network status; and c) upon roaming back to the coverage area of the home network, causing the mobile device to change the IMSI used for network identification of the SIM card back to the first IMSI and then to update its network status.

Further, the present invention relates to a system for providing mobile communication access to mobile communication devices within the coverage area of a home network in a home country, which home network is comprised in the system, which mobile communication devices each comprise a SIM card arranged to identify itself to a network using an IMSI, which system comprises a HLR and is connected to at least one external mobile communication system arranged to provide mobile communication access to said mobile devices within the coverage area of one or several networks in one or several visited countries, between which networks the mobile devices can roam, which system is characterized in that the home network is arranged to, upon receipt of a location update message indicating that a mobile device which is associated with the HLR has moved into the coverage area of a first visited network in a first visited country, send an instruction message over the air to the mobile device to change its IMSI used for network identification to a second IMSI, which second IMSI is associated with the HLR of a first collaborating mobile communication network in the first visited country, and that the home network is arranged to, upon receipt of another location update message indicating that the mobile device has moved into the coverage area of a second visited network in a second visited country, send another instruction message over the air to the mobile device to change its IMSI used for network identification to a third IMSI, which third IMSI is associated with the HLR of a second collaborating mobile communication network in the second visited country.

The present invention also relates to a SIM card for use in a mobile communication device which is arranged to roam between a mobile communication home network in a home country and one or several mobile communication networks in one or several visited countries, which SIM card is arranged to identify itself to each network using an IMSI, which SIM card is characterized in that the SIM card is arranged to store a first IMSI and use it for network identification of the SIM card when in the coverage area of the home network, in that the SIM card comprises a software application arranged to, upon receipt of an instruction message comprising a second IMSI, which message is sent over the air from a HLR with which the SIM card is associated, firstly store the second IMSI on the SIM card and to use it for network identification of the SIM card and in addition to save the first IMSI on the SIM card, and secondly to update the network status, in that the software application is also arranged to monitor in which country the mobile device is currently located and, upon roaming back to the coverage area of the home network, firstly changing the IMSI used for network identification of the SIM card back to the first IMSI and secondly to update its network status.

BRIEF DESCRIPTION OF THE DRAWING FIGURES

In the following, the invention will be described in detail, with reference to the appended drawings, where:

Figure 1:
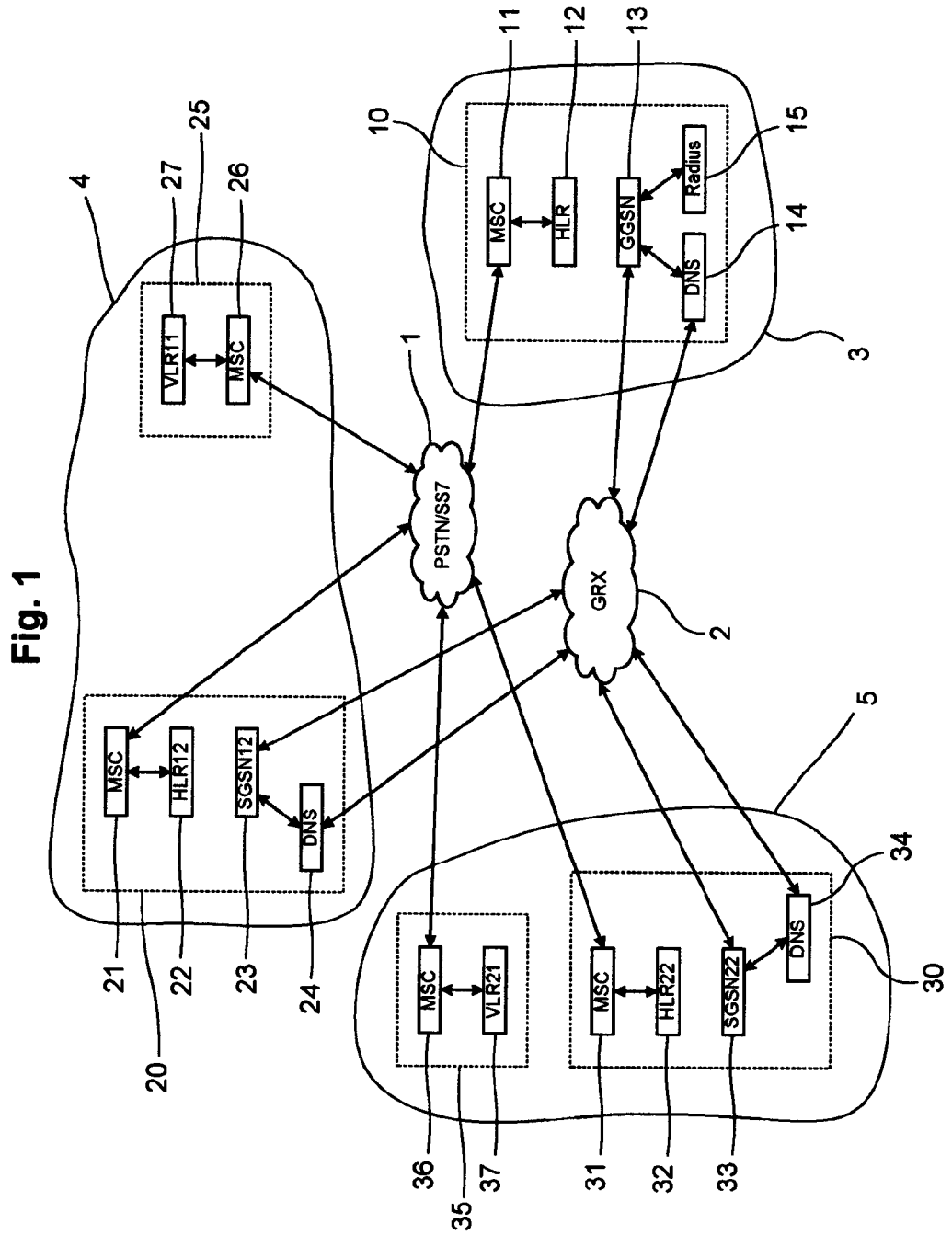
FIG. 1 is a simplified overview diagram of a system according to the present invention for use in a method according to the present invention.

All figures share reference numerals and annotations.

DETAILED DESCRIPTION OF THE INVENTION

FIG. 1 illustrates a mobile communications network 10 which is a home network to a certain mobile communications device (not shown in FIG. 1). In other words, the mobile device is a subscriber to the home network 10. The home network 10 comprises a Mobile Switching Centre (MSC) 11, a Home Location Register (HLR) 12, a Gateway GPRS Support Node (GGSN) 13, a Dynamic Name Server (DNS) function 14 which is conventional as such and a Remote Authentication Dial In User Service (RADIUS) server 15 which also is conventional as such.

The home network 10 can, however, be of any general type which is able to provide access to mobile communication services to the class of mobile devices which use Subscriber Identity Module (SIM) cards for network identification. In FIG. 1, the home network 10 is a GSM/GPRS network, but it is realized that other types of mobile communication networks in which a mobile communication device is identified using a SIM card are also possible to use with the present invention, such as a 3G and LTE network. The same is true regarding the below described foreign networks 20, 25, 30, 35.

The home network 10 is operable within a home country 3. The terms "home network" and "home country" are used simply to indicate a geographical location for the network 10, and does not imply a certain nationality of the mobile device user, an operator or such.

A mobile device can thus, when located in the home country 3, connect to the home network 10 and hence obtain access to mobile communications services. The mobile device can be of any suitable type, such as a mobile phone or a mobile data modem, and comprises a SIM card which is used to identify the mobile device to the network using an IMSI code.

Furthermore, the mobile device is capable of roaming to a first visited network 25 and a second visited network 35, both being similar to the home network 10 and to both of which the mobile device identifies itself using an IMSI code via its SIM card. The first visited network 25 is operable in a first visited country 4, which is different from the home country 3. Similarly, the second visited network 35 is operable in a second visited country 5, different from both the home country 3 and the first visited country 4. The first visited network 25 comprises an MSC 26 and a VLR (VLR11) 27. The second visited network 35 comprises an MSC 36 and a VLR (VLR21) 37.

In the first visited country 4, a first collaborating network 20 is also operable. Like the home network 10, the first collaborating network 20 comprises an MSC 21, a HLR (HLR12) 22, a SGSN (SGSN12) 23 and a DNS 24. As will become clear in the following, the operator of the first collaborating network 20 has beforehand entered into an agreement with the operator of the home network 10 concerning the provision of mobile communication services.

In a similar way, in the second visited country a second collaborating network 30 is also operable, comprising an MSC 31, a HLR (HLR22) 32, and SGSN (SGSN22) 33 and a DNS 34. There is a similar agreement as to the provision of mobile communication services between the operator of the second collaborating network 30 and the operator of the home network 10.

In practice, in each country, there may be several visited networks 25, 35 and several collaborating networks 20, 30 in the sense of the present invention. Furthermore, in any country a visited network 25, 35 may be the same as a collaborating network 25, 35.

When roaming, voice calls are connected over a Public Switched Telephone Network (PSTN) 1, for instance using the SS7 protocol, which PSTN 1 interconnects MSC:s 11, 21, 26, 31, 36. On the other hand, data traffic is routed via a GPRX Roaming Exchange (GRX) 2, interconnecting the GGSN 13 and DNS 14 with SGSN:s 23, 33 and DNS:s 24, 34.

Figure 2:
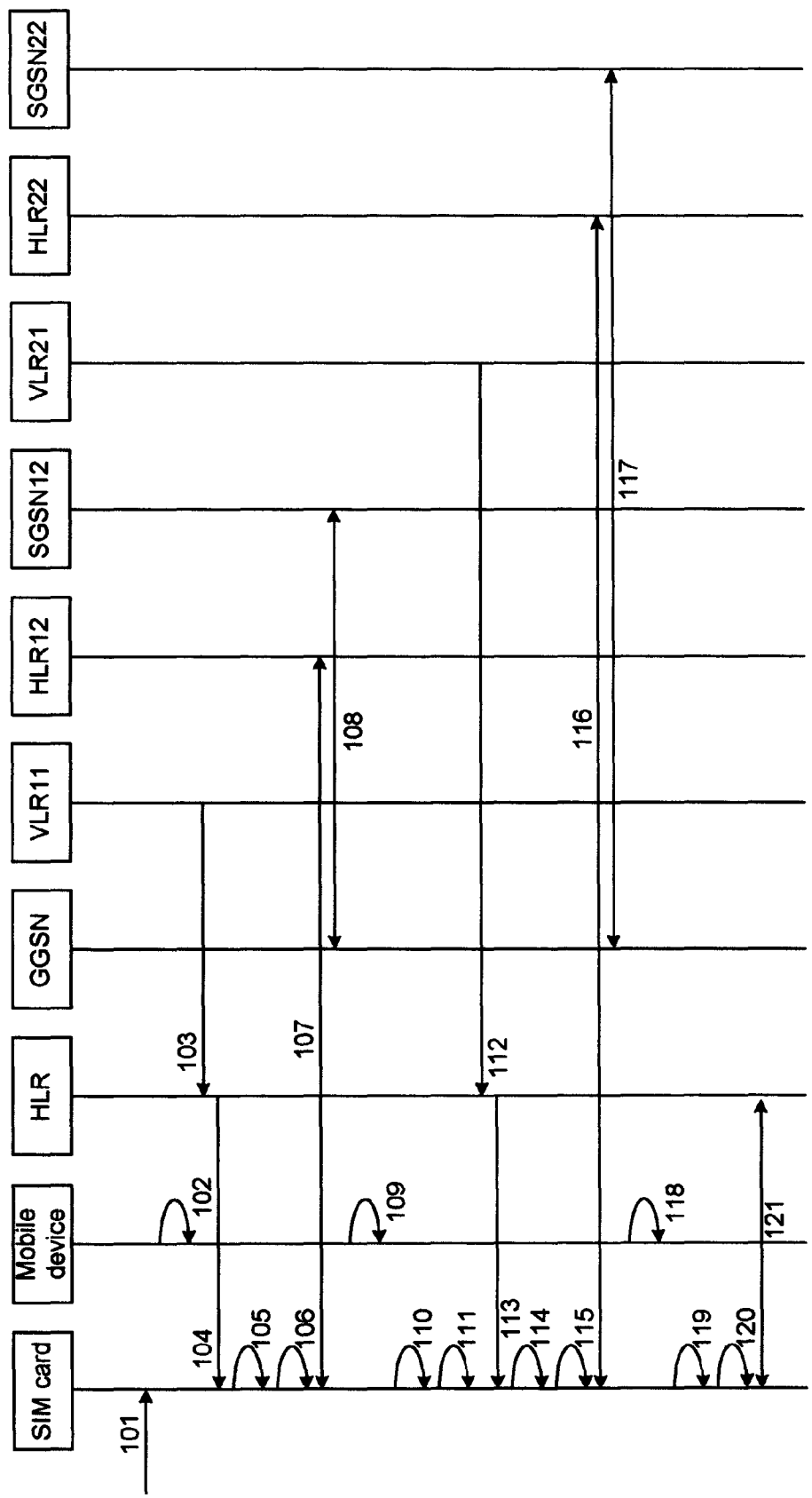
FIG. 2 is a flow chart of a method according to the present invention.

FIG. 2 illustrates, top down, the individual method steps of a method according to the present invention when the above described mobile communication device roams between the home network 10 in the home country 3 and visited networks 25, 35 in visited countries 4, 5.

In a first step 101, a home IMSI is stored on the SIM card and is used for network identification of the SIM card when the mobile device is within the coverage area of the home network 10 and thus provided access to mobile communication services by the home network 10. This step 101 can for example be taken in connection to the provision of the SIM card to the user of the mobile device, when setting up the subscription to the home network 10.

In step 102, the mobile device roams from the home network 10 into the coverage area of the first visited network 25 in the first visited country 4. In other words, the mobile device is brought from the coverage area of the home network 10 to a position in the first visited country 4 within the coverage area of the first visited network 25 in which there is not sufficient network coverage of the home network 10.

This roaming event will, in a step 103, trigger the VLR11 27 of the first visited network 20 to send a location update message to the home network 10, which message is intercepted by the HLR 12 of the home network 10. The location update message includes information about what visited network the VLR11 27 is a part of, and thus indicates that the mobile device has moved from the coverage area of the home network 10 to the coverage area of the first visited network 25.

In a step 104, the HLR 12, upon receipt of the said message, sends an instruction message over the air to the mobile device to change, from the home IMSI to a first visiting IMSI, the IMSI used for network identification of the SIM card. The IMSI change instruction message can, for instance, be sent as an SMS which is received by the SIM card. It is preferred that the provision of the first visiting IMSI to the mobile device is fully automatic and does not involve any specific action on the part of the user of the mobile device.

The first visiting IMSI is selected by the HLR 12 from a list of available IMSI:s for the first visited country 4, see below. Furthermore, the first visiting IMSI is associated with the HLR12 22 of the first collaborating network 20, and is such that a mobile device operating in the network 20 under the identity of the first visiting IMSI will be offered local communication tariffs in the first collaborating network 20, especially local tariffs for data traffic.

In a step 105, carried out in response to the said IMSI change instruction message, the mobile device stores the received first visiting IMSI on the SIM card and uses it for network identification of the SIM card. In addition thereto, the mobile device saves the home IMSI originally used for network identification for later use.

Then, in a step 106, the mobile device performs a device network refresh. This is a locally performed action essentially equivalent to switching the mobile device, or the network connection, off and then on again. In practice the network refresh may be in the form of a SIMOTA refresh or, preferably, a SIMOTA reset.

That the "mobile device" receives the message from the HLR 12 in step 104, updates the IMSI in step 105 and performs the device network refresh in step 106 is to be interpreted so that any functional software and/or hardware part of the mobile device is responsible for conducting these and other such tasks. According to a preferred embodiment, which is illustrated in FIG. 2, it is the SIM card which, being a part of the mobile device when installed therein, conducts the above tasks. The corresponding is true regarding steps 110, 111, 114, 115, 119 and 120, below.

After the device network refresh, in a step 107, the mobile device will be connected to the HLR12 of the first collaborating network 20, since the SIM card identifies itself using the first visiting IMSI, being associated with the HLR12. In other words, after the device network refresh, the mobile device wakes up in the role of a local mobile subscriber to the first collaborating network 20. As a consequence, the connection to the first visiting network 25 will only be temporary, fulfilling the purpose of identifying in the home network 10 the roaming action of the mobile device to the first visiting country 4. Note that in the case where the first visiting 25 and the first collaborating 20 networks are actually the same, the first visiting IMSI will be local to the first visiting network 25, and otherwise the invention is analogously applied.

Thereafter, in a step 108, at least data traffic resulting from use of the mobile device, with its SIM card and identified using the first visited IMSI, is routed between the first collaborating network 20 and the home network 10. In the exemplifying case of a GPRS system, the data traffic is routed between the SGSN12 23 of the first collaborating network 20 and the GGSN 13 of the home network 10 using GRX 2, see FIG. 1.

The first collaborating network 20 may also provide the communication services directly, without involving the home network 10. In this case, the home and collaborating operators may agree upon tariffs beforehand. This, however, will result in the home network 10 operator having no means of monitoring such communications for keeping track of current costs etc. Therefore, it is preferred that the communications of the mobile device, at least the data traffic, terminates at the home network 10 and that it is the GGSN 13 of the home network 10 which provides the final Internet connection to the mobile device. One preferred possibility is to allow the first collaborating network 20 to use its own GGSN (not shown in FIG. 2) as a proxy router for data traffic between the network 20 and the GGSN 13, since this will allow the collaborating network 20 operator to also monitor data traffic.

In a step 109, the mobile device roams further, now from the coverage area of the first collaborating network 20 to the coverage area of the second visited network 35 in the second visited country 5.

The mobile device is arranged to by itself detect such roaming activity and take appropriate action. In FIG. 2 it is the SIM card which itself detects the roaming event and acts. Thus, as a consequence of the roaming event, the mobile device is arranged to, in a step 110, change the IMSI used for network identification of the SIM card back to the home IMSI, which was previously saved in step 105.

Thereafter, in a step 111, the mobile device again performs a device network refresh. This device network refresh command will, in a step 112, again result in a location update message being sent, now from the VLR21 37 of the second visited network 35 to the home network 10.

In a step 113, upon the receipt of the said location update message resulting from the change of IMSI used for network identification of the SIM card, the HLR 12 of the home network 10 sends another instruction message over the air to the mobile device, which message is similar to the above described over the air instruction message, but which instructs the mobile device to change, from the home IMSI to a second visiting IMSI, the IMSI used for network identification of the SIM card. Like the first visiting IMSI, the second visiting IMSI is selected by the HLR 12 from a list of available IMSI:s for the second visited country 5, see below. The second visiting IMSI also offers local communication tariffs, especially data traffic tariffs, in the second collaborating network 30, which may or may not be the same as the second visited network 35.

As an alternative to steps 110, 111 and 112, the HLR 12 may be equipped with means for detecting the roaming of the mobile device, which is at the time associated with the HLR 22 of the first collaborating network 20, to the second visited network 35, for example via a message from the second visited network or from the first collaborating network. In this case, the method will directly proceed to step 113.

The reception of the instruction message from the HLR 12 will, in a step 114 and similarly to step 105 above, result in the mobile device storing the second visiting IMSI on the SIM card and using it for network identification of the SIM card, while in addition thereto again saving the home IMSI for later use.

Then, similarly to step 106 above, in a step 115, the mobile device will perform a device network refresh.

After this network refresh command, in a step 116, the mobile device will upon wakeup connect to the HLR22 32 of the second collaborating network 30 as a local subscriber. This step 116 is thus similar to the step 107 described above.

Then, in a step 117, at least data traffic resulting from use of the mobile device, with its SIM card and identified using the second collaborating IMSI, is routed between the second collaborating network 30 and the home network 10. In the exemplifying case of a GPRS system, the data traffic is routed between the SGSN22 33 of the second collaborating network 30 and the GGSN 13 of the home network 10 using GRX 2, see FIG. 1. What has been said about the relationship between the first visited network 25, the first collaborating network 20 and the home network 10 is also generally applicable to the corresponding relationship between the second visited network 35, the second collaborating network 30 and the home network 10.

In order to avoid unnecessary location update messages, if the mobile device looses contact with the currently used collaborating network without having travelled to another country, it preferably does not alter its IMSI back to the home IMSI. When the network connection is eventually again available while still located in the same country, the connection to the current collaborating network will still be valid.

If and when, however, the mobile device subsequently roams into the coverage areas of further respective mobile communication networks in another country than the current, for example back to the first visited network 20 in the first visited country 4, a corresponding routine will be followed as the one described in connection to steps 109-117, in which the mobile device reinstitutes the home IMSI for network identification, whereupon the currently visited network sends out a location update message to the HLR 12, which in turn instructs the mobile device over the air to update its IMSI used for network identification to an IMSI which is specific to the currently visited country and an available collaborating network in that country, and which offers local rates therein. During all such roaming activities, the mobile device will thus always operate using a network identifying IMSI which offers local tariffs in a mobile communication network in the country in which it is currently located, while saving the home IMSI for future use.

If there is no available collaborating network in a country into which the mobile device is roaming, it is preferred that communication services, at least data traffic, become unavailable for the mobile device while in that country.

When, in a step 118, the mobile device eventually roams back to the coverage area of the home network 10 in the home country 3, the mobile device as a reaction thereto, in a step 119, changes its IMSI used for network identification of the SIM card back to the home IMSI. Then, in a step 120, it performs a device network refresh. Steps 119 and 120 are thus similar to steps 110 and 111. Thereupon, the mobile device will again, in a step 121, connect to the HLR 12 of the home network 10 as a local subscriber.

Using such a system and method, it is possible for the operator of the home network 10 to guarantee that the communication of a mobile user during roaming will always be using a local identity, since the IMSI used for network identification will always offer local tariffs in the network currently visited. As a consequence, the said operator can guarantee a relatively low cost for mobile communication even when roaming.

When roaming to visited networks from the home network or from another visited network, the change of IMSI to a new, local IMSI will be automatic and virtually immediate since the mobile device itself triggers the IMSI update sequence by reinstituting the original home IMSI upon roaming. Only a minimum of downtime, mainly to allow time for the device network refresh to become effective, will interrupt current communications.

By reverting back to the home IMSI, roaming chains are avoided. That is, if the home IMSI was not reinstituted and the device network refresh not performed by the mobile device, the collaborating network from which the mobile device was roaming to a visited network in another country would, since it considers the mobile device a local one, impart its normal roaming behavior, resulting in normal roaming costs etc.

Furthermore, since the home IMSI is always saved, the IMSI can be restored automatically and immediately when the mobile device returns back to the home network 10.

According to one preferred embodiment, at least one of the first, second or subsequent visiting IMSI:s are selected from a respective plurality of IMSI:s, associated with or comprised in the HLR 12 and associated with the respective visited country where the respective visiting IMSI is used. Such a plurality of IMSI:s preferably contains less individual IMSI:s than the total number of users being served by the HLR 12 and which are the subject of the present method. In other words, all users being subscribers to the home network and who are served by the HLR 12 will share a set of available visiting IMSI:s for each of the available visited countries, which set is smaller than the number of such users. Each IMSI in each such plurality is preferably unique to the respective collaborating network to which the IMSI in question is local.

Figure 3:
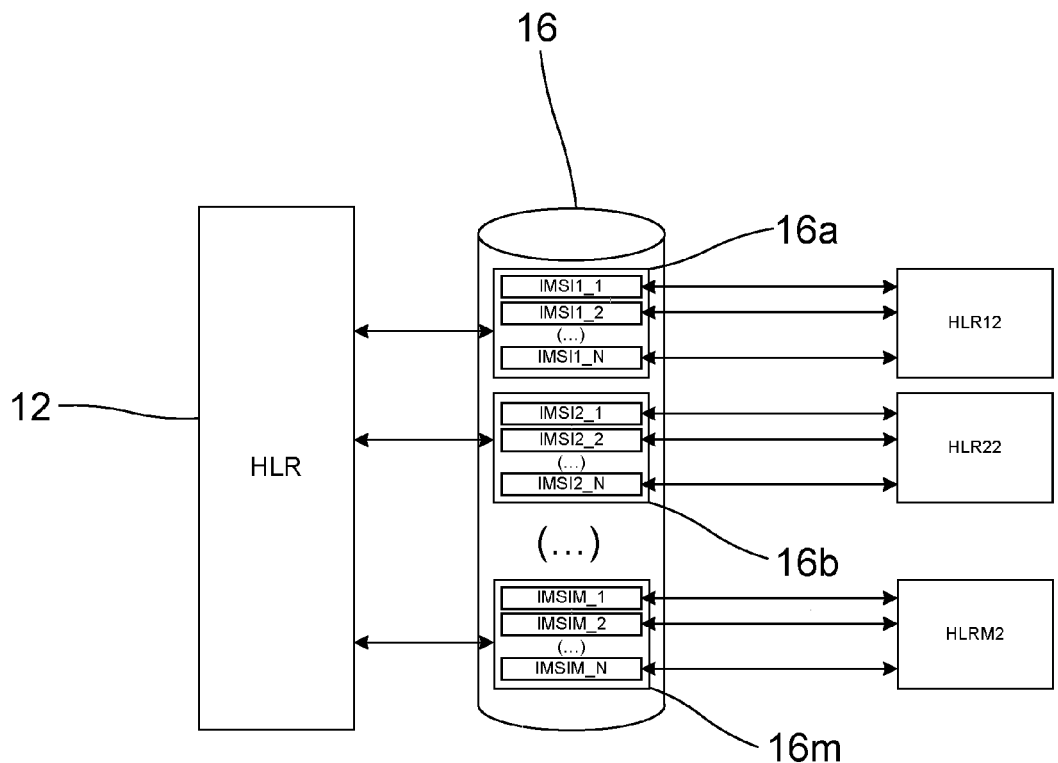
FIG. 3 is a simplified overview diagram of a HLR and an IMSI database according to the invention.

FIG. 3 illustrates this, showing the HLR 12 and a database 16, which may be a standalone database or an integrated part of the HLR 12 itself. The database 16 contains one respective IMSI list 16a, 16b, . . . , 16m for each available visited network 1 . . . M. Each such list contains a set of available visiting IMSI:s. For example, the list 16a, for the first visited country 4, contains a set of N available IMSI:s (IMSI1_1, IMSI1_2, . . . , IMSI1_N) which are available for use in the first collaborating network 20 in the present method and which all offer local tariffs in the first collaborating network 20 for a mobile device identifying itself using the respective IMSI. All IMSI:s in the list 16a are individually associated with the HLR12 22 of the first collaborating network 20, for example via a database entry in the HLR12 22. Correspondingly, each IMSI IMSI2_1, . . . , IMSI2_N is individually associated with the HLR22 32 of the second collaborating network 30.

Preferably, the operator of the home network 10 has initially agreed with the respective operator of each available collaborating network to configure such a respective set of IMSI:s for use in the present method. Since each IMSI is only temporarily used by a visiting mobile device, it is possible to limit the number of configured IMSI:s to a low number in relation to the number of users. Thus, it is preferred that the number of unique IMSI:s in each respective list 16a-16m is not only less than the total number of users being served by the home network 10 operator using the present method, but also less than or equal to 50% of the total number of such users, preferably less than or equal to 20%, most preferably less than or equal to 10% of the total number of such users.

According to a preferred embodiment, the SIM card installed in the mobile device is provided with a software SIM card application, arranged to monitor in which country and possibly also in which network's coverage area the mobile device is currently located. Such monitoring is preferably carried out by reading the communication between the mobile phone and the network or networks to which the mobile device is currently connected or can connect. Preferably, the country codes present in available networks at the current location of the mobile device are read, and a change of such country codes from one country to another is interpreted as a roaming event of the mobile device. In other words, it is only upon an actual detected change of the current country that steps 110 and 119 are performed as described above.

Further in accordance with this embodiment, the said software application is arranged to perform the above described updating changes of the IMSI used for network identification and arranged to perform the above described device network refresh events. It is furthermore preferred that it is the software application which saves the home IMSI while in a visited network.

Using such a SIM card software application, a user of an existing mobile device can obtain access to more costefficient communications while roaming merely by replacing his or her existing SIM card for a new SIM card having the above described SIM card software application preinstalled. Alternatively, the SIM card software application may even be downloaded into an existing SIM card using the mobile network or otherwise, making the method even simpler for the user.

According to a preferred embodiment, the SIM card is caused to be arranged with at least two IMSI memory spaces. In this case, the IMSI currently being used for network identification is stored in a first such IMSI memory space, and the home IMSI is saved in a second such IMSI memory space when another IMSI is used for network identification. This way, the roaming functionality of the present invention can be made completely self-contained within the SIM card, rendering the installation and operation in a mobile device safe and simple.

According to one preferred embodiment, all of the visiting IMSI:s, and possibly also the home IMSI, are associated with a setting in the HLR 12 of the home network 10, or the respective collaborating network's HLR, making available data communication but not voice communication when roaming of the mobile device. In other words, in this case voice communication will not be available for the user of the mobile device while roaming using a visiting IMSI. This way, the roaming experience will be seamless to the user of the mobile device, since any change of MSIDSN or phone number will not be noticed. This embodiment is therefore particularly useful for mobile devices such as a 3G data modem for use with a laptop computer while travelling. It also allows for all traffic to be routed from a visited network 20, 30 to the home network 10 via a central roaming exchange for data traffic, such as GRX 2.

In particular, it is preferred that the data communication to and from the mobile device when being served by a collaborating network is in the form of regular Internet access, and is passed on to the home network 10 using a roaming exchange, like GRX 2, or using a conventional Internet tunnel (not shown in FIG. 1).

Figure 4:
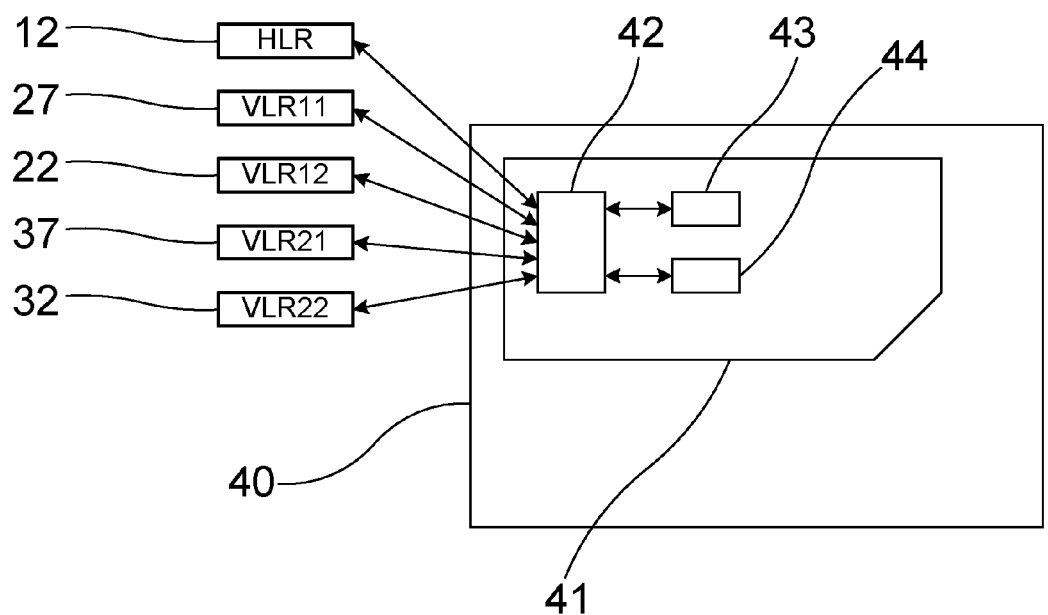
FIG. 4 is a simplified overview diagram of a mobile device having a SIM card according to the present invention.

FIG. 4 illustrates an exemplary mobile device 40, comprising a SIM card 41 installed in the mobile device 40. FIG. 4 is heavily simplified, and does not, for example, show communication paths between the mobile phone 40 and the SIM card 41; the radio antenna of the mobile phone 40 via which all communication between the SIM card 41 and the external world takes place; etc., but is only intended to illustrate the principles of the present invention.

The SIM card 41 comprises a SIM card software application module 42, which is as described above, and which is connected to two IMSI memory places 43, 44. Naturally, there may be more than two IMSI memory places. An example of the function of the SIM card 41, including the software application 42, according to the present invention is the following.

First, a home IMSI is installed in the memory space 43 and used for network identification in the home network 10.

When the mobile device roams to the first visited network 25, an instruction message is sent from the HLR 12 and is received by the SIM card 41, whereupon the software application 42 replaces the home IMSI with the first visiting IMSI in the memory space 43 for use as network identification, as a local subscriber, in the first collaborating network 20, and the home IMSI is instead saved in the memory position 44 for later use. Then the software application 42 performs a device network refresh. Note that the IMSI being used for network identification is not changed on the initiative of the software application 42 when roaming from the home network 10 to a visited network, since the IMSI used for network identification is already the home IMSI.

When the mobile phone thereafter roams from the first collaborating network 20 to the second visited network 35, the software application 42 detects this roaming event, since it monitors the country codes of the currently connected network. Hence, it shifts the home IMSI back to the memory position 43 for use as network identification. Then, it performs a device network refresh. This will result, via a location update message from VLR21 37 to HLR 12, in that the SIM card 41 receives a message to again change the IMSI used for network identification to a second visiting IMSI. Upon receipt of this message, the software application 42 stores the second visiting IMSI in memory location 43 for use as network identification, and again saves the home IMSI in memory location 44. Thereafter the application 42 performs a device network refresh.

Alternatively, the HLR 12 may be equipped with means for detecting the said roaming from the first collaborating network 20 to the second visited network 35, in which case the home network 10 immediately sends the message to the mobile device to change the IMSI used for network identification to the second visiting IMSI, as described above.

When the mobile phone roams back to the home network 10, the software application 42 again recognizes this, as a consequence of its country code monitoring, and as a result reinstalls the home IMSI in the memory position 43 for use as network identification. It then performs a device network refresh.

It is realized that the detailed internal memory management of the SIM card 41 can be carried out in a variety of other, different ways, as long as the end results are the same.

In practice, the message sent over the air from the HLR 12 to the mobile device to change the IMSI, may include instructions to write a new EF_IMSI, to delete the current IMSI from EF_LOCI, and then to perform a network refresh.

The software application 42 may, in practice, comprise the following logic for use when roaming into one country from another: If the last visited country was the home country 3, then save the current country as the last visited country and back up related information (LOCI, LOCIGPRS, PSLOCI, FPLMN, etc.) as the last used home info. If the last visited country, on the other hand, was not the home country 3, then save the current country as the last visited country and reset related information (IMSI, Ki, OPC, LOCI, LOCIGPRS, PSLOCI, FPLMN, etc.) to the last used home info and try to connect to an available network.

Above, preferred embodiments have been described. However, it is apparent to the skilled person that many modifications may be made to the described embodiments without departing from the basic thought of the invention.

For instance, a new or existing SIM card supplied by a first operator can be provided with a software application and memory positions as described above, for carrying out the roaming method of the present invention, by a second operator. In this case, it is the second operator which controls the HLR implementing the above described functionality in terms of sending out visiting IMSI:s to the mobile device, etc. This way, the first operator may offer its own roaming services to the user of the mobile device in which the SIM card is installed to a range of foreign network operators collaborating with the first operator. In locations where no such operators are available, the traffic can instead be routed to the second operator using a visiting IMSI provided by the HLR of the second operator via the software application as described above. In this case, the functionality of the software application is thus only triggered when roaming into certain visited countries.

Thus, the invention shall not be limited to the described embodiments, but may be varied within the scope of the enclosed claims.

The invention claimed is:

1. A method for roaming of a mobile communication device between a mobile communication home network in a home country and one or several mobile communication networks in one or several visited countries, which mobile communication device comprises a Subscriber Identity Module (SIM) card identifying itself to each network using an International Mobile Subscriber Identity (IMSI), wherein the method comprises the steps of
   a) storing on the SIM card a first IMSI and using it for network identification of the SIM card;
   b) upon receipt of a location update message indicating that the mobile device has moved from the coverage area of the home network to the coverage area of a first visited network in a first visited country, firstly causing the home network to send an instruction message over the air to the mobile device to change the IMSI used for network identification of the SIM card to a second IMSI which is associated with the HLR (Home Location Registry) of a first collaborating mobile communication network in the first visited country; secondly causing the mobile device to store the second IMSI on the SIM card and to use it for network identification of the SIM card and in addition to save the first IMSI and then causing the mobile device to perform a device network refresh;
   c) causing the mobile device to detect a roaming of the mobile device from the coverage area of the first collaborating network to the coverage area of a second visited network in a second visited country;
   d) upon detection of such roaming activity, causing the mobile device to change the IMSI used for network identification of the SIM card back to the first IMSI and then to perform a device network refresh, whereupon firstly, upon the receipt of the location update message resulting from the change of IMSI used for network identification, the home network is caused to send an instruction message over the air to the mobile device to change the IMSI used for network identification of the SIM card to a third IMSI which is associated with the HLR of a second collaborating mobile communication network in the second visited country; secondly causing the mobile device to store the third IMSI on the SIM card and use it for network identification of the SIM card while in addition saving the first IMSI and then causing the mobile device to perform a device network refresh; and
   e) upon roaming back to the coverage area of the home network, causing the mobile device to change the IMSI used for network identification of the SIM card back to the first IMSI and then to perform a device network refresh.

2. The method according to claim 1, wherein the second and/or third IMSI:s are caused to belong to a respective plurality of IMSI:s, which plurality in the home network is associated with a respective visited country and caused to contain less individual IMSI:s than the total number of users being served by the HLR and using the method, and in that all IMSI:s in said plurality are caused to be associated with the HLR of the respective collaborating network in the respective visited country.

3. The method according to claim 2, wherein the SIM card is caused to be provided with a software application arranged to monitor in which country the mobile device is currently located, arranged to perform the said changes of the IMSI used for network identification and arranged to perform the said device network refresh performances.

4. The method according to claim 3, wherein the SIM card is caused to be arranged with at least two IMSI memory spaces, in that the IMSI currently used for network identification is stored in a first such IMSI memory space, and in that the first IMSI is caused to be saved in a second such IMSI memory space during times when another IMSI is used for network identification.

5. The method according to claim 3, wherein the software application is caused to monitor in which country the mobile device is currently located by reading the country codes present in available networks at the current location of the mobile device, and in that a change of such country codes is interpreted as roaming of the mobile device.

6. The method according to claim 1, wherein the SIM card is caused to be provided with a software application arranged to monitor in which country the mobile device is currently located, arranged to perform the said changes of the IMSI used for network identification and arranged to perform the said device network refresh performances.

7. The method according to claim 6, wherein the SIM card is caused to be arranged with at least two IMSI memory spaces, in that the IMSI currently used for network identification is stored in a first such IMSI memory space, and in that the first IMSI is caused to be saved in a second such IMSI memory space during times when another IMSI is used for network identification.

8. The method according to claim 6, wherein the software application is caused to monitor in which country the mobile device is currently located by reading the country codes present in available networks at the current location of the mobile device, and in that a change of such country codes is interpreted as roaming of the mobile device.

9. The method according to claim 1, wherein all of the said IMSI:s except possibly the first IMSI are caused to be associated with a setting in the respective HLR with which the IMSI in question is associated making available data communication but not voice communication when roaming of the mobile device.

10. The method according to claim 9, wherein the data communication to and from the mobile device when being served by a collaborating network is in the form of Internet access, and is passed on to the home network using a roaming exchange or an Internet tunnel.

11. A system for providing mobile communication access to mobile communication devices within the coverage area of a home network in a home country, which home network is comprised in the system, which mobile communication devices each comprises a Subscriber Identity Module (SIM) card arranged to identify itself to a network using an International Mobile Subscriber Identity (IMSI), which system comprises a Home Location Registry (HLR) and is connected to at least one external mobile communication system arranged to provide mobile communication access to said mobile devices within the coverage area of one or several networks in one or several visited countries, between which networks the mobile devices can roam, wherein the home network is arranged to, upon receipt of a location update message indicating that a mobile device, the SIM card of which is identified using a home IMSI which is associated with the HLR, has moved into the coverage area of a first visited network in a first visited country, send an instruction message over the air to the mobile device to change its IMSI used for network identification to a second IMSI, which second IMSI is associated with the HLR of a first collaborating mobile communication network in the first visited country, and that the home network is arranged to, upon receipt of another location update message indicating that the same mobile device, which mobile device has roamed from the first collaborating network into a second visited network in a second visited country, and the SIM card of said mobile device is again identified using the said home IMSI, has moved into the coverage area of said second visited network, send another instruction message over the air to the mobile device to change its IMSI used for network identification to a third IMSI, which third IMSI is associated with the HLR of a second collaborating mobile communication network in the second visited country.

12. The system according to claim 11, wherein the second and/or third IMSI:s belong to a respective plurality of IMSI:s, which plurality in the home network is associated with a respective visited country and contains less individual IMSI:s than the total number of users being served by the HLR and using the method, and in that all IMSI:s in said plurality are associated with the HLR of the respective collaborating network in the respective visited country.

13. The system according to claim 11, wherein all of the said IMSI:s except possibly the first IMSI are associated with a setting in the respective HLR with which the IMSI in question is associated making available data communication but not voice communication when roaming of the mobile device.

14. A Subscriber Identity Module (SIM) card arranged to be used in a mobile communication device which in turn is arranged to roam between a mobile communication home network in a home country and one or several mobile communication networks in one or several visited countries, which SIM card is arranged to identify itself to each network using an International Mobile Subscriber Identity (IMSI), wherein the SIM card is arranged to store a first IMSI and use it for network identification of the SIM card when in the coverage area of the home network, in that the SIM card comprises a software application arranged to, upon receipt of an instruction message comprising a second IMSI, which message is sent over the air from a Home Location Registry (HLR) with which the SIM card is associated, firstly store the second IMSI on the SIM card and to use it for network identification of the SIM card and in addition to save the first IMSI on the SIM card, and secondly to perform a device network refresh, in that the software application is also arranged to monitor in which country the mobile device is currently located, in that the software application is arranged to, upon roaming of the mobile device from the coverage area of a first collaborating network in a first visited country, which first collaborating network is not the home network, to the coverage area of a visited network in a second visited country, change the IMSI used for network identification of the SIM card back to the first IMSI and then to perform a device network refresh, and in that the software application is arranged to, upon roaming back to the coverage area of the home network, firstly changing the IMSI used for network identification of the SIM card back to the first IMSI and secondly to perform a device network refresh.

15. The SIM card according to claim 14, wherein the SIM card is arranged with at least two IMSI memory spaces, in that the software application is arranged to store the IMSI currently used for network identification in a first such IMSI memory space, and in that the software application is arranged to save the first IMSI in a second such IMSI memory space during times when another IMSI is used for network identification.

16. The SIM card according to claim 14, wherein the software application is arranged to monitor in which country the mobile device is currently located by reading the country codes present in available networks at the current location of the mobile device, and in that the software application is arranged to interpret a change of such country codes as roaming of the mobile device.

* * * * *